Oct. 20, 1959    J. E. FREDERICK    2,909,671
BASIC GOVERNOR CONTROLLED FUEL SYSTEM
Filed June 13, 1958    5 Sheets-Sheet 1

WITNESSES:
Bernard R. Gieguey
James F. Young

INVENTOR
James E. Frederick
BY
Paul E. Friedemann
ATTORNEY

United States Patent Office 2,909,671
Patented Oct. 20, 1959

2,909,671

BASIC GOVERNOR CONTROLLED FUEL SYSTEM

James E. Frederick, Clarence, N.Y., assignor to Westinghouse Electric Corporation, East Pittsburgh, Pa., a corporation of Pennsylvania Application June 13, 1958, Serial No. 741,764

7 Claims. (Cl. 290—40)

This invention relates to electric systems of control including magnetic amplifiers, and more particularly to systems of control, for governing the operation of a prime mover, coupled to drive a mechanical load, or prime movers, coupled to drive electric generators, or sets of generators, as for example, alternators.

One broad object of this invention is the provision of accurate and reliable electric governor controlled means for the fuel, supplied to an engine-driving electric generating means.

Another broad object of this invention is the provision of means to hold a close steady-state control of the frequency of an alternator coupled to a prime mover by controlling the fuel being supplied to the prime mover.

Another object of this invention is the provision of means to enable the prime mover driving an alternator to sooner than somewhat similar prior art controls anticipate a change in frequency due to a change in load and to readjust the fuel supply of the prime mover before there is a frequency change.

It is also an object of this invention to provide for no frequency droop in a system including any number of alternators connected in parallel by suitable controls of the prime movers driving the alternators.

It is also a broad object of this invention to provide for the division of the total load on a plurality of alternators connected in parallel in accordance with the individual ratings of the alternators.

It is also an object of this invention to accomplish the desired functions without the use of tubes or other fragile components having a rather limited useful life but with the use of components which have a long useful life and which will withstand shock and vibration with no damage to its components.

The objects recited are merely illustrative. Other objects and advantages will become more apparent from a study of the following specification and the accompanying drawings, in which.

Figure 3A:
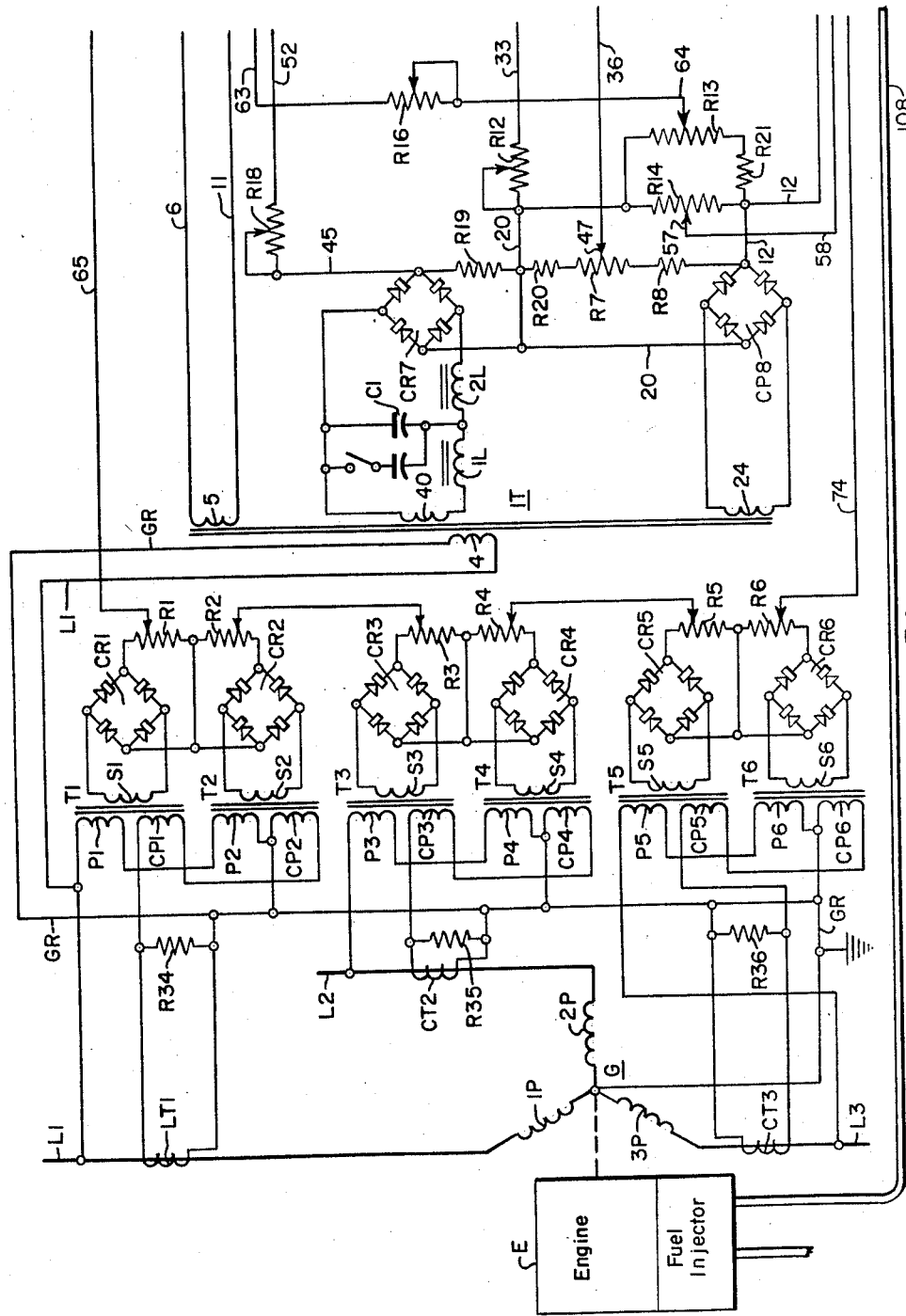
Figure 3B:
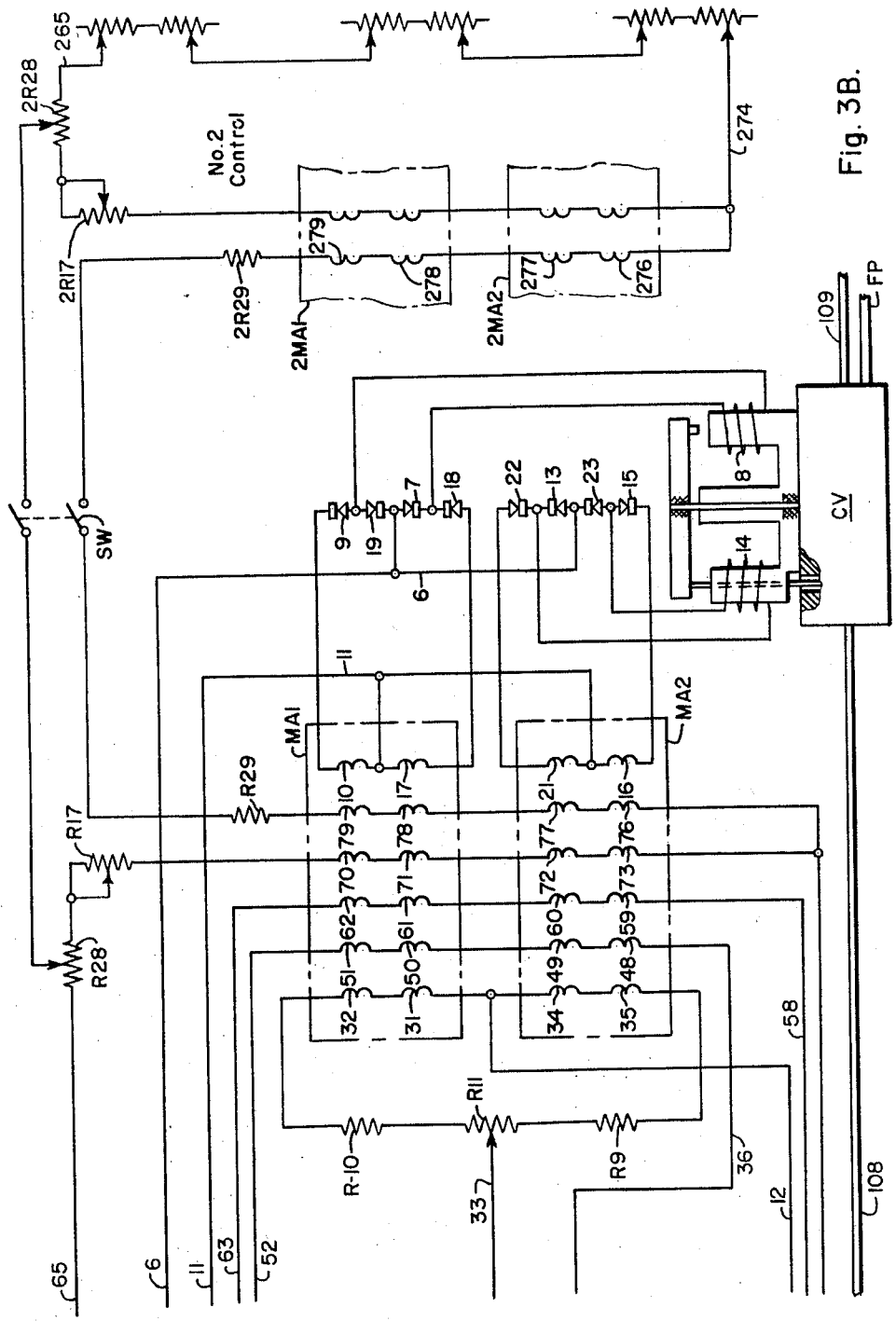
Figure 4:
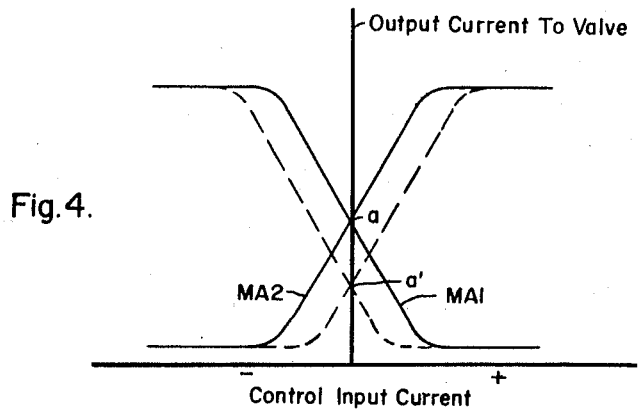
Figure 5:
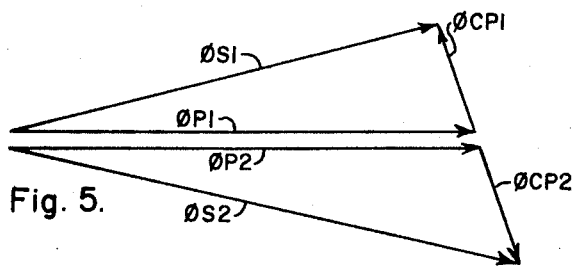
Figure 6:
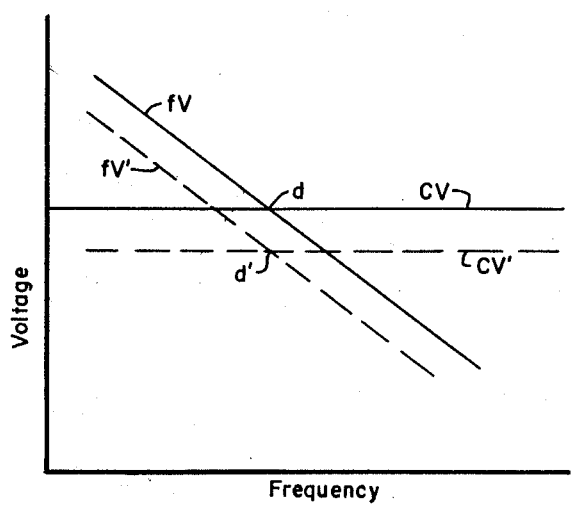
Figure 7:
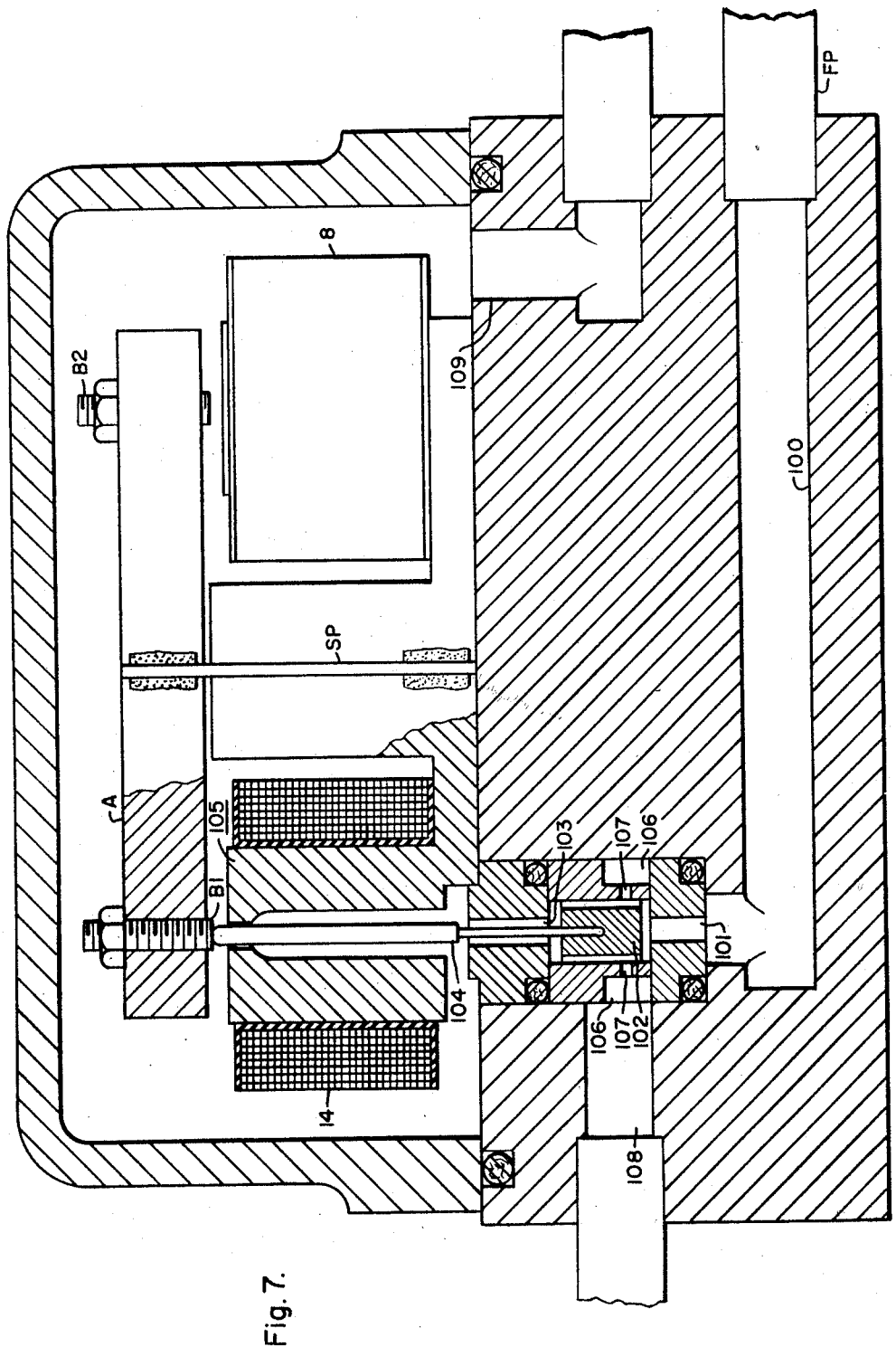

Figs. 3A and 3B together are a diagrammatic showing of the electric apparatus and the engine to be controlled;

Fig. 4 shows the operating characteristic of the magnetic amplifiers used;

Fig. 5 shows vector diagrams illustrating the function of the load responsive feature of the control included in this invention;

Fig. 6 shows some curves of value in understanding the frequency control of this invention; and Fig. 7 shows the control valve used in more detail.

Figure 1:
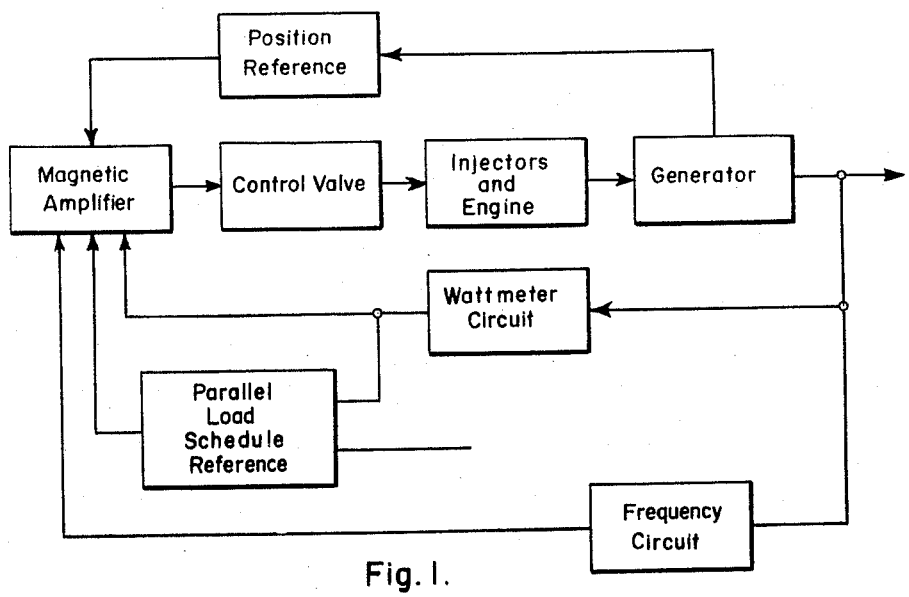
Figure 1 is a schematic showing, in block form, of the electrical elements of this invention.
Figure 2:
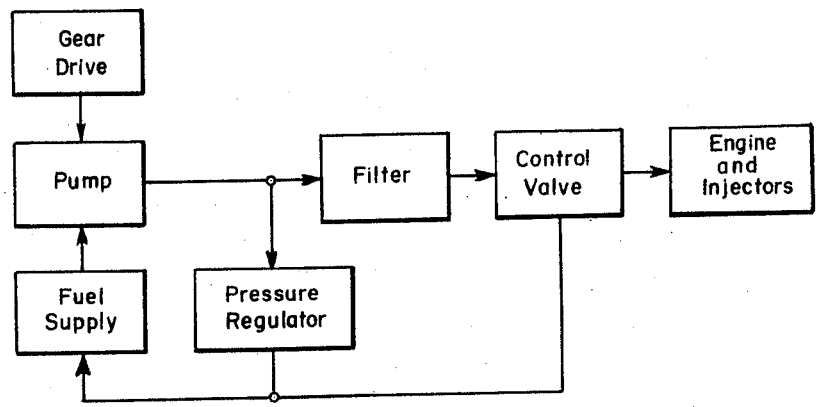
Figure 2 is a schematic showing, in block form, of the hydraulic apparatus used with this invention.

To gain a broad understanding of this invention, a brief preliminary discussion of Figs. 1 and 2 may be helpful.

The block designated Generator represents the alternator G mechanically coupled to the engine included in the block designated Injectors and Engine. The generator G is electrically connected to a load, not shown.

The throttle for the engine and the control valve are one and the same and the control valve is controlled electromagnetically by the output of a magnetic amplifier.

To provide for proper control of the engine fuel control valve the magnetic amplifier is controlled as a function of the alternator frequency through the frequency circuit.

When two alternators are operated in parallel a parallel load schedule reference is also provided to provide for appropriate load sharing of the two alternators.

To provide the hydraulic control a suitable pump, coupled to the engine through a suitable gear drive, pumps liquid fuel directly to the fuel control valve which in turn supplies fuel to the engine injectors.

To understand some of the details of this invention reference may be had to Figs. 3A and 3B.

The engine E is shown coupled to drive the alternator G which alternator is in use connected to supply power to leads L1, L2 and L3 and to the control apparatus.

The alternator may be Δ-connected or Y-connected but as shown is a Y-connected machine having the outer terminals of its phase windings 1P, 2P and 3P connected to the load leads L1, L2 and L3, respectively. A transformer primary winding P1 of transformer T1 and a primary winding P2 of transformer T2 are, by means of the ground conductor GR connected across winding 1P; a transformer primary winding P3 of transformer T3 and a primary winding P4 of transformer T4 are as shown, connected through GR across winding 2P; and a transformer primary winding P5 of transformer T5 and a primary P6 of transformer T6 are, as shown, connected through GR across winding 3P.

A current transformer CT1 is connected in the output of phase 1P and has its output connected across the resistor R34 and to the primary windings CP1 and CP2 of transformers T1 and T2, respectively.

Current transformer CT2 is connected in the output of phase 2P and has its output connected across the resistor R35 and to the primary windings CP3 and CP4 of transformers T3 and T4.

A current transformer CT3 is connected in the output of phase 3P and has its output connected across resistor R36 and to the primary windings CP5 and CP6 of transformers T5 and T6.

The secondary windings S1, S2, S3, S4, S5 and S6 of the transformers T1, T2, T3, T4, T5, and T6 are connected across rectifiers CR1, CR2, CR3, CR4, CR5 and CR6. The direct current terminals are interconnected with the potentiometers R1, R2, R3, R4, R5 and R6, as shown. The summation of the outputs of these potentiometers is such that the direct current voltage appearing at leads 65 and 74 is a function of $EI \cos \theta$, where E is the alternator voltage, I is the load current and $\cos \theta$ is a measure of the power factor.

Each transformer of this group has a simple loop magnetic circuit. To understand the function of this portion of the control it suffices to describe the function of transformers T1 and T2.

These two transformers have primary windings P1 and CP1, and P2 and CP2, respectively. The primary windings P1 and P2 are connected in a loop circuit with phase winding 1P and are wound with relatively large number of turns on the cores in the same sense.

The phase winding 1P has the secondary windings of the current transformer CT1 connected in a loop circuit with the resistor R34 having a relatively low resistance value. The primary windings CP1 and CP2 are connected across this resistor R34 with the primary CP1 being wound in one sense with respect to its transformer core and the primary winding CP2 being wound in an opposite sense with respect to its core. The voltage drop across resistor R34 being rather low and the number of turns for the primary windings CP1 and CP2 being considerably lower than the number of turns on primary windings P1 and P2, the output of secondary windings S1 and S2 together is a function of the load current times the power factor.

The voltage supplied by windings P1 and P2 of equal turns and acting additively is the reference voltage. The load intelligence is applied to windings CP1 and CP2 of equal turns and acting subtractively. The vector diagrams, see Fig. 5, of the function of this circuitry shows that the flux $\phi S1$ as far as secondary S1 is concerned, is the vector sum of the fluxes $\phi P1$ and $\phi CP1$ produced by the ampere turns of windings P1 and CP1. Similarly, the vector diagram also shows that flux $\phi S2$ so far as secondary S2 is concerned, is the vector sum of the fluxes $\phi P2$ and $\phi CP2$ produced by the windings P2 and CP2. The voltages produced by the secondary windings S1 and S2 are rectified by the rectifiers CR1 and CR2 to produce two direct current voltages across potentiometers R1 and R2. When the ampere turns of P1 and P2 are chosen to be large with respect to the ampere turns of CP1 and CP2 the difference voltage of the two direct current voltages becomes closely proportional to $I \cos \theta$ where I represents the load current in phase 1P and $\cos \theta$ is the power factor.

The functions of the transformers T3 and T4, and T5 and T6, and the associated rectifiers CR3 and CR4, and CR5 and CR6 and the potentiometers R3 and R4, and R5 and R6 is the same as for the elements T1, T2, CR1, and CR2, and R1 and R2 above discussed.

This means that by suitable adjustment of the taps on potentiometers R1 to R6, inclusive, an output can be obtained on conductors 65 and 74 that is a function of $EI \cos \theta$.

The fuel supplied to the engines is controlled by the injectors which are in turn controlled by the control valve CV.

Control valve CV is shown in some detail in Fig. 7. The diesel fuel is admitted to the control valve by fuel pipe FP and supplies the fuel under constant pressure to the conduit 100. The bottom orifice 101 thus allows fuel to flow through it depending on the position of the valve member 102 disposed above it. This valve member is of a fluted structure with the central portion being of sufficient diameter to control the flow of fuel both through the bottom orifice 101 and the top orifice 103.

The valve member is operatively connected to the non-magnetic stem 104 which passes in an opening longitudinally of one leg of an E-shaped magnet 105 to contact with the bottom end of a valve positioning stem, or bolt B1 threaded into the left end of the armature A. The right end of the armature is provided with a similar bolt B2 for adjusting the limit of oscillatory travel of the armature.

The armature is pivoted on a stiff centering spring SP, which spring permits the armature to move only in proportion to the actuating force acting on the spring. The actuating force is provided by the coils 8 and 14 mounted on the outer legs of the E-shaped magnet 105. These coils are energized from the main windings of magnetic amplifiers MA1 and MA2 discussed more in detail hereinbelow.

The position of the valve 102 determines the pressure of the fuel in annular chamber 106 supplied with fuel through the openings 107. This means that fuel under a controlled pressure is supplied to conduit 108 and thus the fuel injectors of the engine. The injectors thus function to supply fuel as a function of the effective actuating force acting on armature A.

The excess fuel passes through the upper orifice 103 to enter the valve housing, from which housing the fuel drains back through the conduit 109 to the fuel supply reservoir, not shown.

The main windings of the magnetic amplifiers are supplied from the isolation transformer IT. This isolation transformer has a primary winding 4 connected across L1 and GR and has three secondary windings 5, 24 and 40.

The secondary winding 5 supplies the energization of the main windings of the magnetic amplifiers. When terminal 6 is positive, an energizing circuit is established from this terminal 6 through rectifier 7, actuating coil 8 of the control valve CV, rectifier 9, main winding 10 of the magnetic amplifier MA1 to terminal 11 of the secondary 5. During this same half cycle, a second energized circuit is established from terminal 6 through rectifier 13, actuating coil 14 of the control valve CV, rectifier 15, main winding 16 of the magnetic amplifier MA2 to terminal 11.

For the second half cycle, when terminal 11 is positive, an energizing circuit is established from this terminal 11 through main winding 17 of magnetic amplifier MA1, rectifier 18, actuating coil 8 and rectifier 19 to terminal 6. During this same second half cycle a circuit is also established from terminal 11 through main winding 21, rectifier 22, actuating coil 14, rectifier 23 to terminal 6.

From the circuitry just traced, it is apparent that coils 8 and 14 are energized with full-wave rectified direct current, and from the direction of the current through the coils 8 and 14 and their winding direction, it is further apparent that the actions of the coils 8 and 14 on the control valve CV are in opposition to each other. The position of the valve 102 is thus a function of the difference of the energization of coils 8 and 14.

Since the magnetic amplifiers here used are of the self-saturating type, the true effective function of coils 8 and 14 is thus determined by the total effect of all the control windings on the magentic amplifiers. The preferred point of operation of each magnetic amplifier used in this control is preferably at, or near, the midpoint of the straight portion of the operating characteristic, as a point $a$ of the operating characteristics, shown in Fig. 4. Further, the design and selection of the amplifiers is such that their operating characteristics are substantially the same. Further, the straight portion of the characteristic is preferably quite steep but not actually vertical.

To cause each magnetic amplifier to operate at or near the midpoint of its characteristic, the magnetic amplifiers are provided with bias windings.

The secondary winding 24 of the isolation transformer is connected to the alternating-current terminals of the full-wave rectifier CR8. The output of the rectifier supplies a direct current voltage to leads 12 and 20, and this voltage is a constant voltage, except for abnormal alternator operation.

To energize the bias windings a circuit is established from the positive conductor 12, through bias windings 31 and 32 of the magnetic amplifier MA1, resistor R10, bias balance potentiometer R11, adjustable tap 33, bias level adjusting potentiometer R12, to the negative terminal 20.

Another energizing circuit is also established from the positive conductor 12 through biasing windings 34 and 35 of the magnetic amplifier MA2, resistor R9, the bias balance potentiometer R11, bias level adjusting potentiometer R12 to conductor 20 since the adjustable potentiometer R12 is in the circuit of all of the biasing windings, this potentiometer can be used to adjust the "up-and-down" position on the magnetic characteristic of both magnetic amplifiers. Since the relative amount of resistance of the potentiometer R11 in the respective circuits of bias windings 31 and 32, and 34 and 35 is adjustable, it is apparent that downward movement of tap 33 increases the excitation of bias windings 34 and 35 and at the same time decreases the excitation of bias windings 31 and 32. Of course, the reverse effect is caused by upward operation of tap 33.

From the discussion of the circuitry and control of the bias windings it is apparent that the operations of the magnetic amplifiers may be adjusted to any level on the operating characteristic and that balanced operation may be obtained at the levels selected.

The output terminals of rectifier CR8 are also connected to energize a potentiometer circuit. This circuit may be traced from the positive conductor 12 through resistor R8, frequency reference potentiometer R7, and resistor R20 to the negative conductor 20. The utility of this potentiometer circuit will become apparent as the description proceeds.

The isolation transformer is also provided with secondary winding 40. This secondary winding 40 is connected in a loop circuit with a reactor 1L, having a selected reactance value, and a capacitor C1, having a selected capacitance value. A second reactor 2L, having a selected reactance value, and a full-wave rectifier CR7, connected, through its alternating-current input terminals, in series with the reactor 2L, are connected in parallel to the capacitor C1.

The direct-current output terminals of fullwave rectifier CR7 are connected to conductor 20 with the positive terminal being connected to conductor 45 and the negative terminal being connected to conductor 20. The operating characteristics of the elements CR7, 40, 1L, C1 and 2L are so selected that the direct current voltage impressed across resistor R19 is substantially inversely proportional to frequency over a given relatively narrow range but which range includes the desired operating frequency of the alternator G. Curve $fV$ in Fig. 6 represents this voltage. A rise of frequency from a selected value causes a decrease in voltage across resistor R19 and a decrease in frequency from a selected value causes a rise in voltage across resistor R19.

From explanations made hereinbefore, it is apparent that the voltage drop through resistors R8, R7 and R20 is from positive to negative at conductor 20. This means that tap 47 on potentiometer R7 is positive with respect to conductor 20. Since conductor 45 is positive with respect to conductor 20, it is apparent that when the output voltage of rectifier CR8 is constant which for all normal operation of the alternator is constant, and the frequency and voltage output of secondary 40 is constant, that tap 47 may be shifted to such a point on resistor R7 that tap 47 has the same positive voltage value as conductor 45. Shifting tap 47 merely means that curve CV is shifted up or down as required. If the alternator frequency is at the desired value, say 60 cycles, and the alternator voltage is at the desired constant value, then the voltage value across conductors 45 and 20 will be, for example, at $d$ on curve $fV$. By shifting tap 47, the curve CV is shifted until it includes point $d$.

In practice tap 47 is moved in such a direction until the voltage across tap 47 and conductor 45 is zero. Thereafter, any departure of the frequency from the desired frequency will shift the direct voltage across conductor 45 and tap 47 along curve $fV$. If the frequency increases, conductor 45 will have a lower voltage than tap 47 and when the frequency decreases, tap 47 will have a lower voltage than conductor 45. The magnitude of the direct current voltage across tap 47 and conductor 45 will be a measure of the magnitude of the departure of the frequency from a desired frequency and the sense, or effective polarity of the voltage, will be a function of the direction of the departure of the frequency from a desired frequency.

To make the functions of the magnetic amplifiers reflect any change in frequency, an energizing circuit is established from tap 47 through conductor 36, control windings 48 and 49 of magnetic amplifier MA2, and control windings 50 and 51 of magnetic amplifier MA1, conductor 52, and frequency gain adjusting resistor R18 to conductor 45.

Changes in alternator voltage have but a small effect, but if there is such a change the outputs of the secondary windings 24 and 40 are affected substantially alike. The output from secondary 24 during a decrease in voltage will shift curve CV to position CV', but the output of secondary 40 will shift curve $fv$ to $fv'$. The difference voltage is still zero since point $d'$ is still at the same frequency value represented by point $d$.

A governor control that takes into account frequency changes only may not be sufficient. A control valve feedback is also provided for the magnetic amplifiers and a control responsive to generator load is provided.

Frequency control and valve position control do not take into account the effect on speed of load variations on the alternator. In fact, in the absence of some load compensation control the speed characteristic will have a droop.

With a proper load sensing circuit and control, the control of the frequency is made extremely close under conditions of changing load or other transient disturbances. For the moment suffice, to know that the load intelligence voltage appears across leads 65 and 74, with lead 65 being positive and lead 74 being negative. With leads 65 and 74 energized as mentioned, an energized circuit is established from positive lead 65 through all of the resistor sections of the load sharing potentiometer R28, a selected number of resistor sections of the frequency regulating potentiometer R17, control windings 70 and 71 of magnetic amplifier MA1, control windings 72 and 73 of the magnetic amplifier MA2 to the negative lead 74.

By means of potentiometer R17 the magnitude of the load compensation may be adjusted and the magnitude can be adjusted at will to change the normally dropping speed characteristic to a substantially flat, or even rising speed characteristic.

The utility of potentiometer R28 will become apparent as the description proceeds.

To accomplish this control a no-load control valve position adjusting potentiometer R14 is connected across leads 12 and 20 and a fixed resistor R21 in series with a potentiometer R13 are also connected across leads 12 and 20.

The frequency reference control is then effected by the circuit from tap 57 on potentiometer R14 through conductor 58, control windings 59 and 60 of magnetic amplifier MA2, control windings 61 and 62 of magnetic amplifier MA1, conductor 63, position gain adjusting resistor R16 to tap 64 of potentiometer R13.

The foregoing description is mostly directed to a governor control for a prime mover driving one alternator. In actual practice two or more alternators, sometimes not of equal capacity, are connected to supply a common load and are driven by separate prime movers. When this is the case provision must be made in the control of each governor to effect proper load sharing.

The control of each prime mover and its alternator is identical to the one hereinabove disclosed. This is indicated at the right of Fig. 3A by No. 2 control.

Each control is provided with a potentiometer as R28. For the second alternator this is designated as potentiometer 2R28, also in the output circuit corresponding to leads 65 and 74 are leads 265 and 274.

When a second alternator is being used and load balancing is to be effected the switch SW is closed. If there is perfect balance of the loads of the two alternators, the taps on potentiometers R28 and 2R28, with respect to conductors 74 and 274, are at the same potential, but if there is a load unbalance a difference of potential exists between taps and the polarity depends on the alternator which tends to take the greater load.

If the alternator #1 takes the greater load, lead 74 will be more positive than lead 274. The result is that a control current flows from lead 74 through the control windings 76 and 77 of magnetic amplifier MA2, control windings 78 and 79 of magnetic amplifier MA1, resistor R29, switch SW, control windings 279 and 278 of magnetic amplifier 2MA1, control windings 277 and 276 of magnetic amplifier 2MA2, conductor 274.

When the polarity is reversed so that lead 274 is more positive than lead 74 then the effect is reversed. In the first case the load on generator 2G is increased and that of G is decreased and in the second case the operation is opposite.

In some prior art governors, the load signal from conductors 65 and 74 is bucked by the output from a feedback potentiometer on a throttle actuator. In the concept of this governor the load signal is nulled by a mechanical spring force, the force of the armature centering spring SP. In other words, dependent on the strength of the signal from leads 65 and 74, the armature A of the control valve VC will be deflected a particular amount against the restraining force of the armature centering opening SP. The greater the load on the generator the greater will be the $I \cos \theta$ indication and as a result the greater the deflection of the armature. As the armature deflects more and more the amount of fuel admitted to the fuel injectors is increased and the power output of the engine is increased. The centering spring thus in a sense provides a mechanical feedback.

The frequency sensing portion of the electric governor produces an output proportional to the frequency of the generator and this output is matched against a reference voltage set equal to say 60 cycles. As the frequency of the generator varies above or below base frequency, a positive or negative voltage is obtained from the frequency portion. This signal, when amplified by the magnetic amplifiers, controls the speed of the prime mover at any particular load.

The control valve and injectors are located at the engine. The amount of fuel admitted to each cylinder per intake stroke in this type of system is proportional to the amount of fuel pressure and the length of time that the orifice in the fuel injector is opened. Since constant speed is maintained, the length of time the fuel injector orifice is open for admission of fuel is a constant. Therefore, the amount of fuel injected into the cylinder is proportional to the pressure of the fuel in conduit 108 and as a result the power output of the engine is proportional to fuel pressure in conduit 108.

Assuming no load on the engine we will have zero output from the wattmeter section. And assuming that the engine is at rated speed the output of the frequency measuring and frequency reference circuit will be zero. At this no load condition, the armature will not be deflected since there is no load signal. However, as the speed varies above and below rated speed, the output of the frequency section of the electric sensing circuits will send increasing and decreasing currents to the coils 8 and 14 causing small movements of the armature about its no load position thereby causing small changes in fuel pressure to the fuel injectors to regulate speed at the no load condition. Assume that the load is suddenly changed from no load to full load, the output of the wattmeter section will immediately jump from zero to its full load value causing an increase in current in coil 8 and a decrease in current in coil 14 deflecting the armature down on the right side and up on the left side. The angular movement of the armature due to the armature spring center restraining force will be proportional to the amount of the load signal. In this new angular position of the armature, the valve will be permitted to rise closing off the top orifice and opening the bottom orifice, thereby, admitting increased fuel pressure. The output of the engine will increase; however, we may not end up at base frequency at the new load position and the frequency circuit will once again make a positive or negative correction to the coils about this new angular position. For any load change between zero and full load, the angular movement of the armature will be proportional, the travel of the valve above the bottom orifice, and the amount of fuel change to the injectors will be proportional.

We have, therefore, a complete electric governor in which all the sensing is done electrically (load sensing, frequency sensing and the actuation of an E core armature assembly). The only moving parts in the whole governor are the armature and the valve which move approximately ±.005 inch.

From the foregoing it will be noted that all the electrical control signals are added and amplified by the magnetic amplifier to give an electrical signal that will enable the remaining circuitry to maintain constant generator frequency.

To briefly summarize some of the advantages of this invention it is to be noted that the control:

(a) The number of moving parts are at a minimum;
(b) Simpler and cheaper, yet equally reliable control;
(c) Reduces time delay in actuating circuits;
(d) The invention does not use vacuum tubes or other fragile components, but uses only components that will withstand shock and vibration without change in operation;
(e) Reduces size of control required to throttle fuel since very little force is required to operate on the fuel direct;
(f) Eliminates the heating problem due to recirculating of a fixed volume of fluid in a governor pump.

While but one embodiment of the invention has been disclosed, it is to be understood that the invention is capable of various adaptions, for example to controls which permit the governor to maintain alternators at any practical frequency, and that still other changes and modifications may be made which all fall within the spirit of the invention.

I claim as my invention:

1. An electric governor for a prime mover coupled to drive an alternator the frequency output of which is to be maintained constant, in combination, a fuel flow control valve for the prime mover, a centering spring for the valve, means for adjusting the initial position of the valve, a conduit for supplying fuel under constant pressure to the valve, a conduit for transmitting fuel to the prime mover at a pressure determined by the operation of the valve, electromechanical means for effecting the operation of the valve, magnetic amplifier means for energizing the electromechanical means, control means, operable as a function of the frequency of the alternating current output of said alternator, for controlling the operation of the magnetic amplifier means, second control means responsive to the spring force of the centering spring for providing a control effect negative with respect to said magnetic amplifier means, and third control means responsive to the useful power output of the alternator for providing a positive control effect on said magnetic amplifier means.

2. An electric governor for a prime mover to which fuel is supplied by injectors and which prime mover is coupled to drive an alternator the frequency of which is to be maintained constant, in combination, a fuel flow control valve for controlling the pressure of the fuel supplied to the injectors, a centering spring for the valve, a conduit for supplying fuel under constant pressure to the valve, a conduit for transmitting fuel to the injectors at a pressure determined by the operation of the valve, electromechanical means for effecting the operation of the valve, magnetic amplifier means for energizing the electromechanical means, control means, operable as a function of the frequency of the alternating current output of said alternator, for controlling the operation of the magnetic amplifier means, second control means responsive to the spring force of the centering spring for providing a control effect negative with respect to said magnetic amplifier means, and third control means responsive to the useful power output of the alternator for providing a positive control effect on said magnetic amplifier means.

3. In an electric system of control for maintaining the frequency of the alternating current output of an alternator coupled to a prime mover at a predetermined frequency, in combination, a fuel pressure control valve for the prime mover, which valve in use is operable to change the pressure of the fuel flowing to the prime mover and thus change the speed of the prime mover, electromechanical means for effecting the operation of the valve to change the valve position, magnetic amplifier means for energizing the electromechanical means, control means for providing a reference signal as a function of the frequency variation of the alternating current output of said alternator from said predetermined frequency for controlling the operation of the magnetic amplifier means, and further control means responsive to the useful power output of the alternator for providing a further control effect on said magnetic amplifier means.

4. In an electrical system of control for controlling the speed of a prime mover, the combination of, a fuel pressure control valve for the prime mover, electromagnetic means for effecting the actuation of the valve to thus control the pressure of the fuel flowing to the prime mover and thus control the speed of the prime mover in accordance with the energization of said electromagnetic means, said prime mover in use being coupled to generating means for generating an alternating current, circuit means including current rectifying means connected to said generating means for producing as a reference signal a constant direct current voltage independent of changes in frequency of the current produced by said generating means, second circuit means including rectifying means also connected to the generating means for producing a direct current voltage proportional to frequency, magnetic amplifier means having its output windings connected to energize said electromagnetic means, said magnetic amplifier means having control windings energized by a direct current that is proportional to the difference between the voltage of the reference signal and the voltage proportional to the frequency of the alternating current generated by the generating means coupled to the prime mover.

5. In an electric system of control for controlling the speed of a prime mover, the combination of, a fuel pressure control valve for the prime mover, electromagnetic means for effecting the actuation of the valve to thus control the pressure of the fuel flowing to the prime mover and thus to control the speed of the prime mover in accordance with the energization of said electromagnetic means, said prime mover in use being coupled to generating means for generating an alternating current, circut means connected to said generating means for producing a direct current voltage proportional to the frequency of the alternating current generated by said generating means, a source of direct current voltage of a constant value, mixing circuitry for said direct current voltage proportional to frequency and said direct current voltage of constant value to provide an output as a function of the difference of said direct current voltages, magnetic amplifier means having its output windings connected to energize said electromagnetic means, said magnetic amplifier means having control windings energized by said direct current voltage output of said mixing circuitry.

6. In an electric system of control for maintaining the frequency of the alternating current output of an alternator coupled to a prime mover constant, in combination, a fuel pressure control valve for the prime mover, which valve in use is operable to change the pressure of the fuel supplied to the prime mover and thus to change the speed of the prime mover with reference to a selected constant speed, a spring for holding the valve in a selected initial position, electromechanical means for effecting the operation of the valve, magnetic amplifier means for energizing the electromechanical means, control means, operable as a function of the frequency of the alternating current output of said alternator, for controlling the operation of the magnetic amplifier means, second control means responsive to the useful power output of the alternator for providing a positive control effect on said magnetic amplifier means, third control means responsive to the spring force acting on the valve as it is moved from its initial position for providing a control effect that is negative to the effect of the second control means on said magnetic amplifier means, a second electric system of control and apparatus to be controlled as hereinbefore recited, and further control means responsive to the difference of the useful power outputs of the two alternators thus involved for controlling the relative effects of the two magnetic amplifier means involved to balance the loads on the two alternators.

7. In an electric system of control for maintaining the frequency of the alternating current output of an alternator coupled to a prime mover at a predetermined frequency, in combination, a fuel pressure control valve for the prime mover, which valve in use is operable to change the fuel pressure supplied to the prime mover to change the speed of the prime mover, electromechanical means for effecting the operation of the valve to change the prime mover speed, magnetic amplifier means for energizing the electromechanical means, control means for providing a reference signal as a function of the frequency variation of the alternating current output of said alternator from said predetermined frequency for controlling the operation of the magnetic amplifier means, further control means responsive to the useful power output of the alternator for providing a further control effect on said magnetic amplifier means, a second electric system of control and apparatus to be controlled as hereinbefore recited, and still further control means responsive to the difference of the useful power outputs of the two alternators thus involved for controlling the relative effects of the two magnetic amplifier means involved to balance the loads of the two alternators.

References Cited in the file of this patent

UNITED STATES PATENTS

| | | |
|---|---|---|
| 2,008,404 | Schaelchlin | July 16, 1934 |
| 2,558,729 | Buechler | July 3, 1951 |
| 2,622,236 | White | Dec. 16, 1952 |
| 2,727,694 | Helmick et al. | Dec. 20, 1955 |